United States Patent [19]

Wittrock

[11] 4,373,590
[45] Feb. 15, 1983

[54] TILLING APPARATUS

[75] Inventor: Michael C. Wittrock, Arvada, Colo.

[73] Assignee: The Eversman Mfg. Company, Denver, Colo.

[21] Appl. No.: 143,609

[22] Filed: Apr. 25, 1980

[51] Int. Cl.³ .............. A01B 73/00; A01B 33/02; A01B 33/08

[52] U.S. Cl. .................. 172/78; 172/103; 172/776; 172/311; 172/123; 172/125; 172/548; 172/556; 172/456

[58] Field of Search .......... 172/311, 78, 103, 125, 172/49, 49.5, 48

[56] References Cited

U.S. PATENT DOCUMENTS

| | | | |
|---|---|---|---|
| 1,415,663 | 5/1922 | Lilleberg | 172/532 |
| 2,816,495 | 12/1957 | Brooks | 172/103 X |
| 2,835,182 | 5/1958 | Smithburn | 172/103 X |
| 3,087,557 | 4/1963 | Hohstadt | 172/123 X |
| 3,233,685 | 2/1966 | Brewer | 172/119 |
| 3,233,686 | 2/1966 | Steadman | 172/556 X |
| 3,306,369 | 2/1967 | Brewer | 172/319 |
| 3,362,482 | 1/1968 | Riddle | 172/119 |
| 3,702,638 | 11/1972 | Takata | 172/540 |
| 3,746,101 | 7/1973 | Takata | 172/112 |
| 4,074,765 | 2/1978 | Van der Lely | 172/311 X |
| 4,098,345 | 7/1978 | Van der Lely | 172/103 X |
| 4,151,883 | 5/1979 | Van der Lely et al. | 172/32 |

FOREIGN PATENT DOCUMENTS 27513  7/1955  Finland .................. 172/31

Primary Examiner—George J. Marlo
Attorney, Agent, or Firm—Ancel W. Lewis, Jr.

[57] ABSTRACT

Tilling apparatus disclosed has a rotor shaft with axially spaced multiple tine and hub assemblies having hoe portions of adjacent tines overlapping one another. The apparatus is constructed as a central section and has wing sections pivotally connected to the central section. A first pivot axis for each wing section is the same horizontal plane as the rotor shaft. A first link connects at its lower end to the wing section at the first pivot axis and at its upper end to the central section at a second pivot axis. A thrust link driven by a two-way cylinder moves the wing section about the first pivot axis and then about the second pivot axis. Each tine hub is made in two half-bodies supporting two tines at 90 degrees, with a recess to turn adjacent hubs 30 degrees to one another. Each tine has a bevel on the outer side and a smooth hard surface on the inner side. A drive train coupling power to the rotor shaft has cross drive shafts with extensible and retractable telescoping sections, a chain coupling between each cross drive shaft and the rotor shaft, and a shock absorbing shear pin coupling inclusive of flexible members between an input hub and an output hub.

24 Claims, 17 Drawing Figures

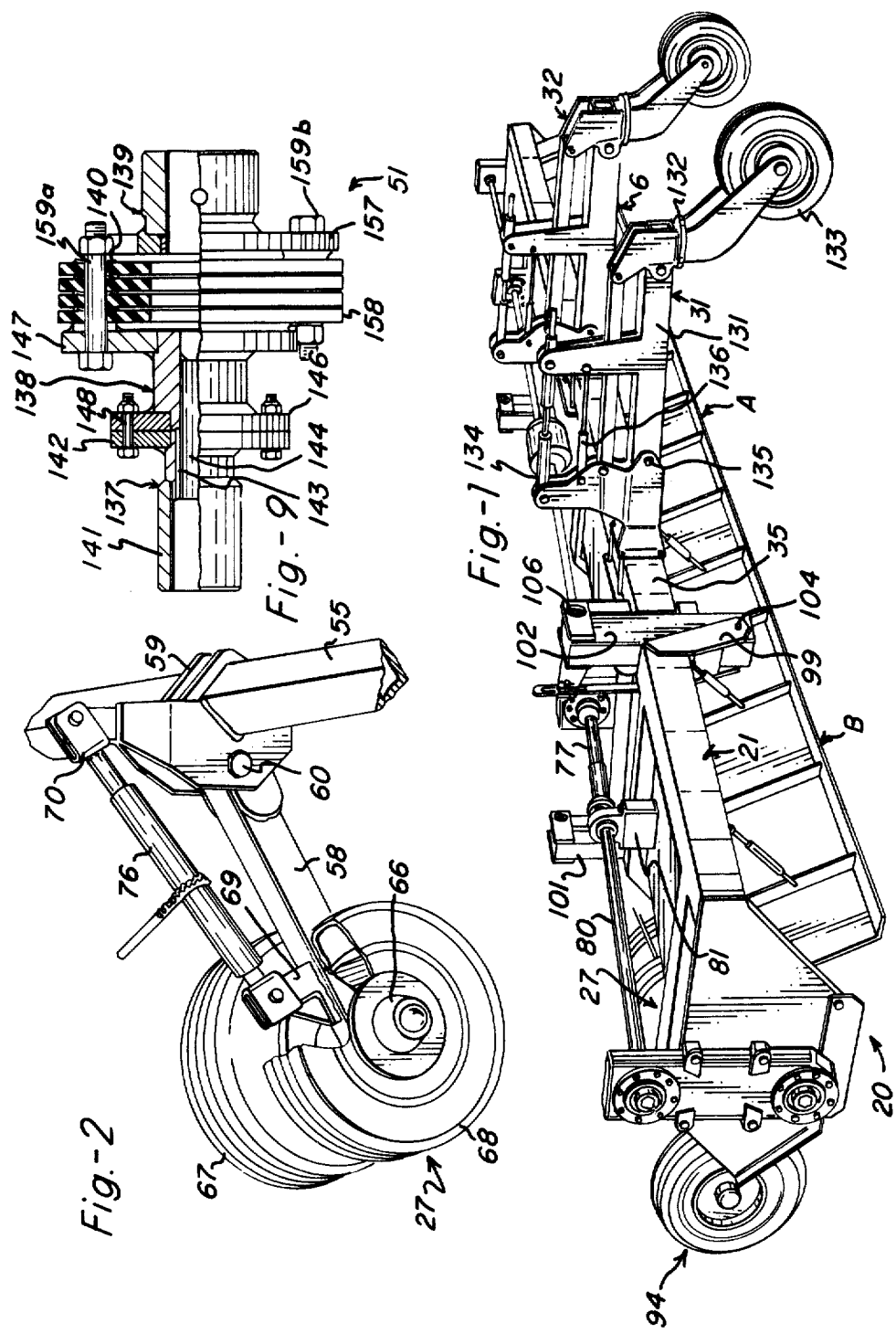

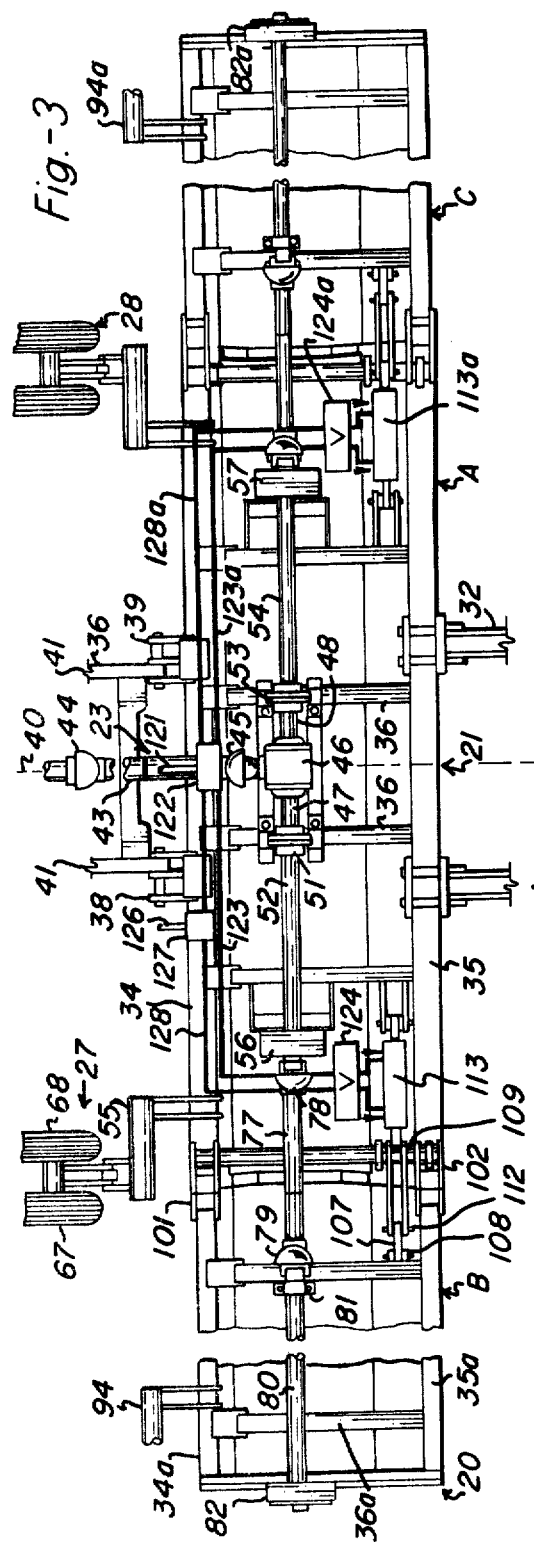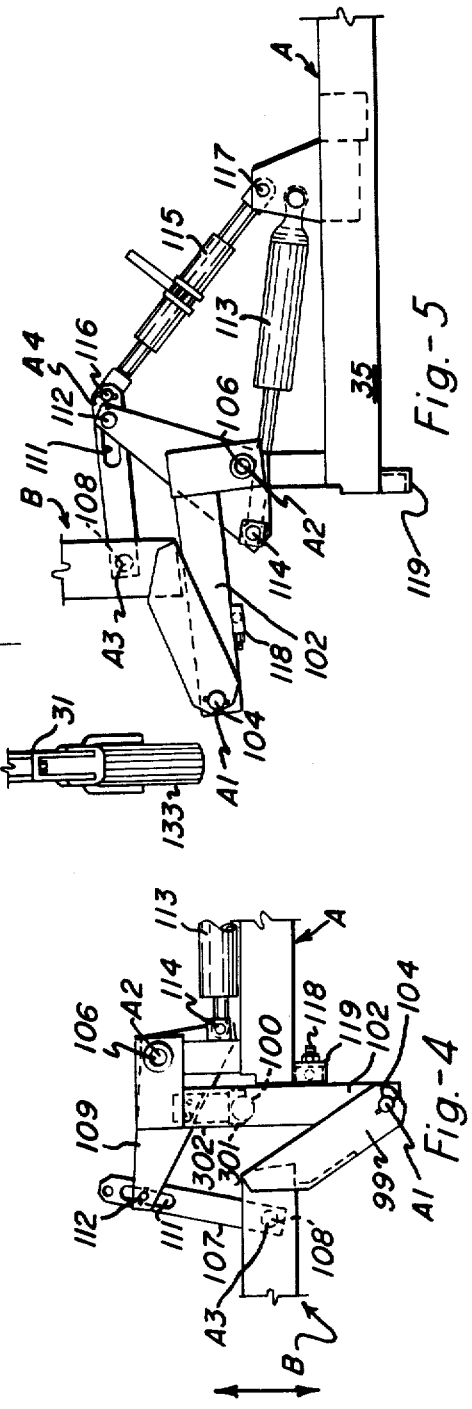

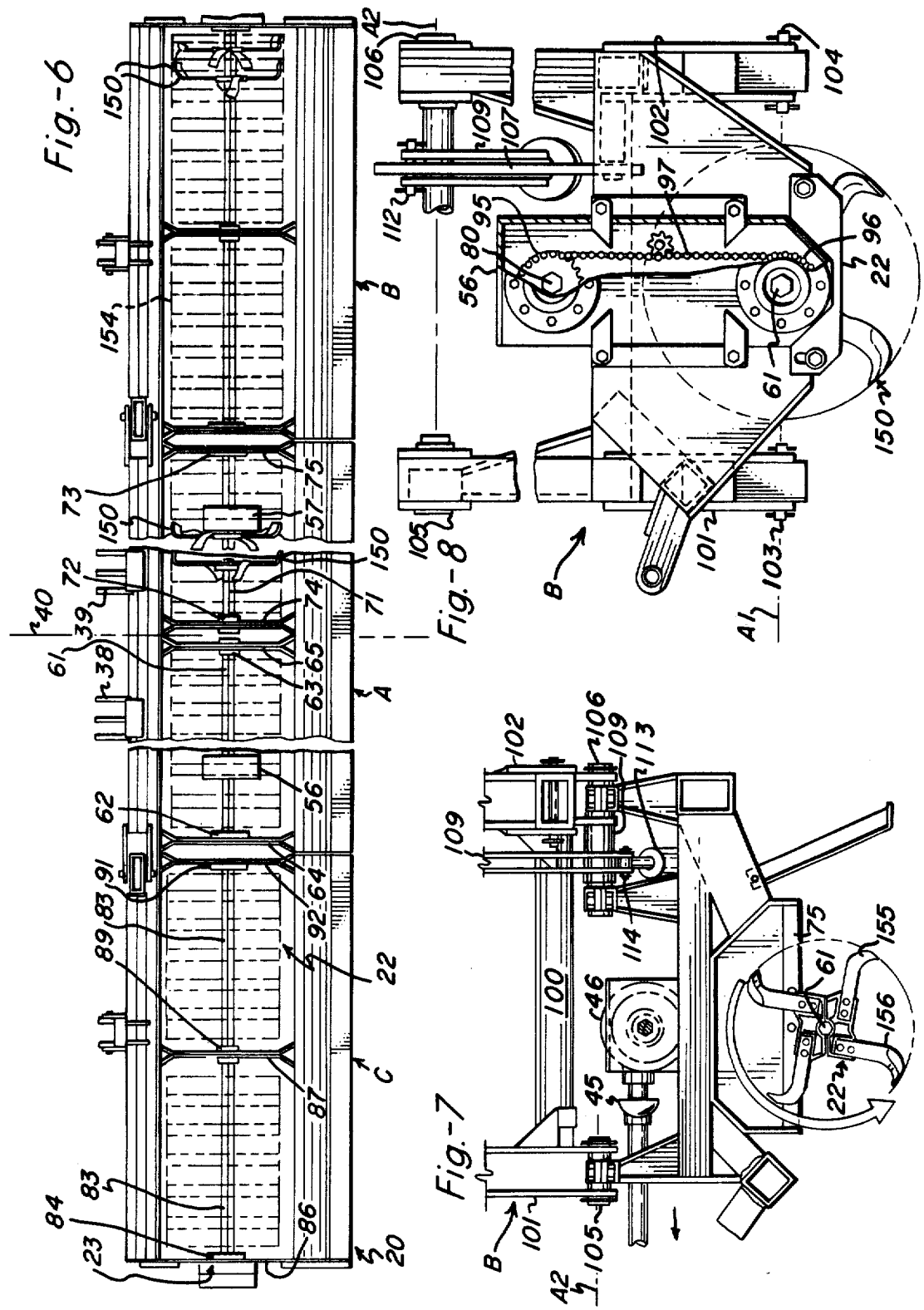

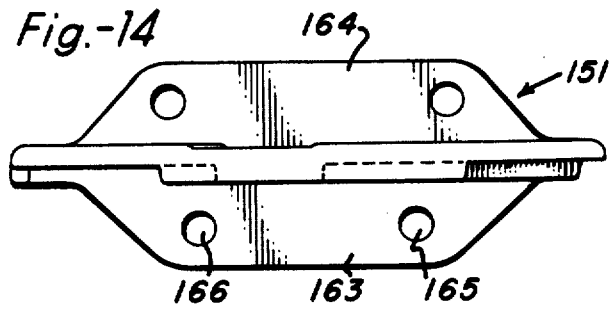
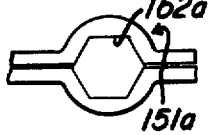
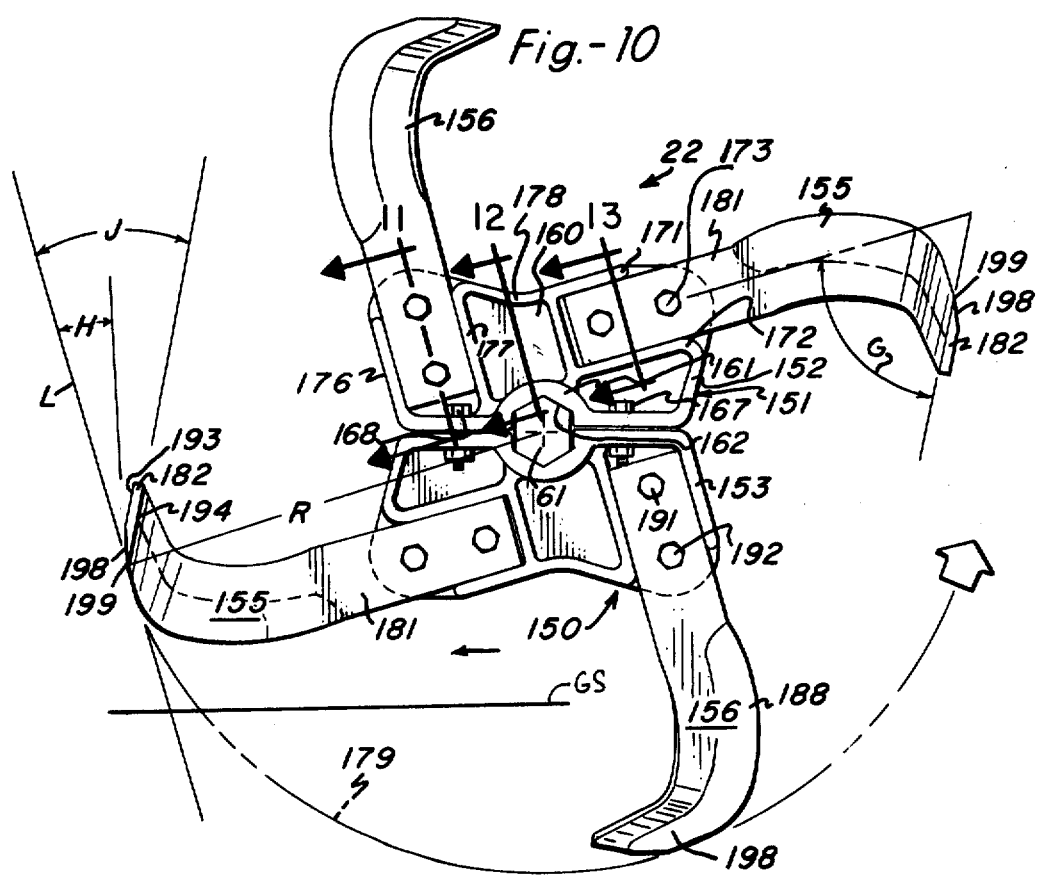

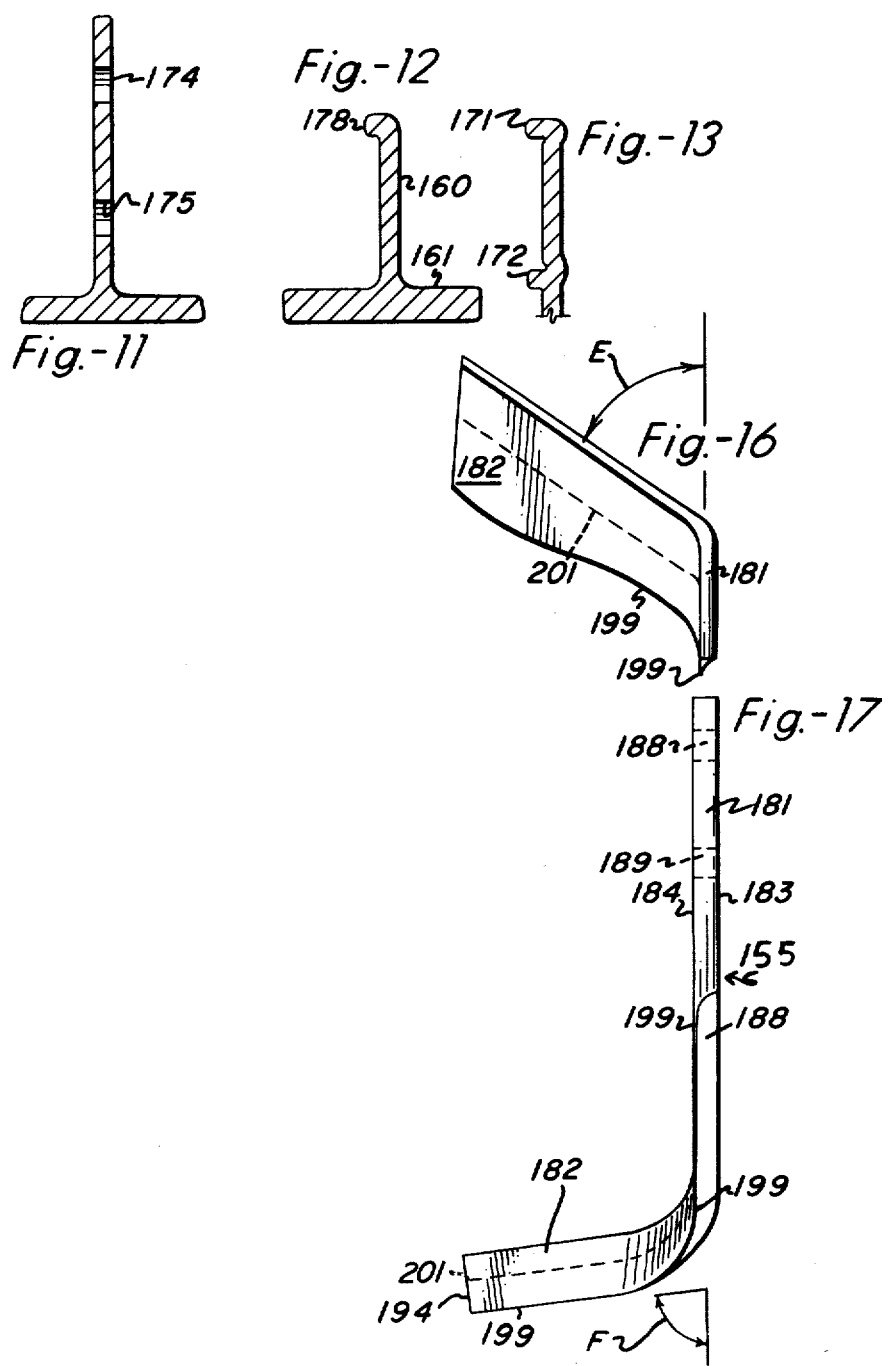

TILLING APPARATUS

TECHNICAL FIELD

This invention relates generally to earth-working implements and more particularly to improvements in implements having power-driven tilling rotors.

BACKGROUND ART

Earth-working apparatus having power-driven rotors that carry a plurality of generally L-shaped tines arranged radially about the shaft and in a spiral pattern along the shaft have heretofore been provided for agricultural tilling, road building and the like. Examples of prior U.S. Pat. Nos. illustrative of this type of apparatus are Lilleberg 1,415,663, Riddle 3,362,482, and Takata 3,702,638.

Recent developments in this art, particularly for agricultural tilling, have been toward wider and heavier apparatus that will cut a wider swath of material, as exemplified in Takata U.S. Pat. No. 3,746,101 and van der Lely U.S. Pat. No. 4,151,883. Wider and heavier tilling apparatus requires durable, robust construction that will withstand the pounding, twisting and shock stresses on a heavier rotor, including instances where hard objects are struck. In addition, wider apparatus requires more power to turn the heavier rotor.

Additional tilling width may be provided by using fold-up sections. An example of prior art related to fold-up wings on non-driven blades is shown in Poland U.S. Pat. No. 4,050,523. The disclosure of this patent, however, is of a non-driven tool and does not deal with the problem of the heavier power-driven tine assemblies such as those of the present invention.

DISCLOSURE OF INVENTION

In accordance with the present invention there are disclosed improvements in tilling apparatus that provide for increased durability, power efficiency and increased tilling capacity. An upper drive train has a shock-absorbing shear pin coupling to absorb shock and torque overloads and shear, if required, to prevent parts of the apparatus from breaking. Ground-supporting wheels readily adjust the depth of the tilling rotor. A durable split hub is readily adjusted to different positions on the rotor shaft, easily removed from the rotor shaft, and holds the tines firmly in place during the tilling operation. An improved tine and improved mounting position for the tine decrease the power requirements. A sectional construction enables fold-up during transport and the tilling of a greater swath during operation. A novel hinge construction for the wing sections enables them to be moved between raised and lowered positions and includes a lower pivot in the plane of the axis of the rotor which provides a minimum of variation in tillage width for each row and also provides flexibility of movement of the wing sections up and down for rolling ground. A hydraulic power system for the wings and support wheels operates off the tractor hydraulic system.

BRIEF DESCRIPTION OF DRAWINGS

The details of this invention will be described in connection with the accompanying drawings, in which:

FIG. 1 is a rear perspective view of a tilling implement having the opposed wing sections disposed in a lowered working position;

FIG. 2 is a perspective view of one of the forward depth gauge wheels mounted on the central section using two wheels;

FIG. 3 is a top plan view of the implement shown in FIG. 1 with intermediate portions removed and portions of the rear lift-assist and front depth gauge wheel assemblies removed;

FIG. 4 is a rear elevation view of a portion of the implement showing the pivotal connection between the wing section and central section with the wing section in the lowered working position;

FIG. 5 is a rear elevation view of the pivotal connection shown in FIG. 4 with the wing section locked in the raised transport position;

FIG. 6 is a bottom plan view of the implement shown in FIG. 1 that has been inverted end for end;

FIG. 7 is a left-hand end elevation view of the implement with the left side wing section in the raised transport position;

FIG. 8 is a left-hand elevation view of the implement with the left side wing section in the lowered working position;

FIG. 9 is an enlarged side elevation view partially in section of the shock absorbing coupling;

FIG. 10 is a side elevation view of one hub and tine assembly mounted on a rotor shaft;

FIG. 11 is a sectional view taken along lines 11—11 of FIG. 10 with the tine removed;

FIG. 12 is a sectional view taken along lines 12—12 of FIG. 10;

FIG. 13 is a sectional view taken along lines 13—13 of FIG. 10 with the tine removed;

FIG. 14 is a top plan view of the hub with the tines removed;

FIG. 15 is a fragmentary side elevation view of the alternate hub construction;

FIG. 16 is a top plan view of a left-hand tine shown in FIG. 10 with the shank portion disposed in an upright position; and FIG. 17 is a front elevation view of the tine shown in FIG. 16.

DETAILED DESCRIPTION

Referring now to the drawings, the tilling implement 20 shown, generally stated, includes a support 21, a tilling rotor 22 supported for rotation and forward vehicular movement by the support 21, and a drive train 23 coupled to the rotor 22 for transmitting rotary power from a suitable power source to rotate same as the implement is moved forwardly over a field or the like. The tilling implement shown is of a sectional construction which includes a central section A and a pair of left and right side wing sections B and C that are hingedly or pivotally connected at opposite sides of the central section A.

The support for the rotor of the central section A includes a front cross member or tool bar 34, a laterally extending rear cross member or tool bar 35 spaced from and parallel to bar 34, and a plurality of laterally spaced longitudinal connecting members 36 joining the cross members to form a generally rectangular truss that is symmetrical with respect to a longitudinal center line of the implement designated by numeral 40. Members 34, 35 and 36 are of tubular construction. The terms "longitudinal" and "lateral" as used herein are with reference to the direction of travel for the implement, although it is recognized that the cross members have a much greater length than the longitudinal connecting members.

The rotor support 21 further includes a pair of laterally spaced, oppositely disposed, sidewall portions 64 and 65 in the form of carrier bearing weldments, also seen in FIG. 7, on one side of the longitudinal center line and a pair of similar laterally spaced, oppositely disposed sidewall portions 74 and 75 on the opposite side of the longitudinal center line 40, again providing bearing support structure that is symmetrical with respect to the longitudinal center line of the implement. Sidewall portions or weldments 64 and 65 have shaft-supporting bearings 62 and 63, respectively. Sidewall portions or weldments 74 and 75 have shaft-supporting bearings 72 and 73, respectively.

A left side depth gauge wheel assembly 27 and right side depth gauge wheel assembly 28 mount on the front tool bar 34 and extend forwardly therefrom on opposite sides of the center line and a left side lift assist wheel assembly 31 and right side lift assist wheel assembly 32 mount on the rear tool bar and extend rearwardly therefrom to support the rotor for vehicular movement in operation.

As best seen in FIG. 2, more specifically the depth gauge wheel assembly 27 is shown attached to a front cross bar 55 which in turn is fastened to the front tool bar 34 of the center section. Assembly 27 is comprised of a support arm 58 having a clamp 59 pivotally connected at pivot pin 60 at one end adapted to releasably clamp onto the front cross bar 55, and a hub 66 at the opposite end on which two wheels 67 and 68 are mounted for rotation. A lower lug 69 is mounted on the arm and an upper lug 70 is mounted on the clamp. A ratchet-type link 76, of adjustable length, with a clevis at each end and an actuating lever, connects between the lugs. The length of the link 76 determines the height of the front end of the rotor support in relation to the ground surface.

The lift-assist wheel assembly 31 shown has a main frame 131 that connects at the forward end to the rear tool bar 35 and a swivel base 132 at the rear end on which the wheel 133 is mounted to swivel with respect to the rear end of frame 131. A mechanically adjustable link 134, which includes a threaded screw and nut extending between upstanding front and rear arms, is used to pivot the main frame about a forward pivot 135 for mechanically leveling the machine with respect to the soil surface as viewed from the side. The rear end of the support frame is also raised and lowered by actuating a two-way hydraulic cylinder 136 using the hydraulic system of the tractor in a manner similar to the cylinders for the wing sections.

The support for the rotor of the wing sections is of a similar construction to that of the central section above described. Each wing section has a front tool bar 34a, a rear tool bar 35a, and laterally spaced connecting member 36a. There are further provided an outer sidewall 86, an intermediate sidewall portion 87 and an inner sidewall portion 92. Sidewall portions 87 and 92 are similar to weldment 75 above described. Sidewall 86 carries shaft bearing 84, sidewall portion 87 carries bearing 89 and sidewall portion 90 carries bearing 91. A depth gauge wheel assembly 94 similar to assembly 27 mounts on the front tool bar and uses only one wheel to assist in supporting the implement for vehicular movement and provide depth gauging of the associated wing section.

The rotor of the central section A is made in two parts of an identical construction that are symmetrical with respect to the longitudinal center line of the rotor. One rotor section includes a shaft 61 having ends journaled in the bearings 62 and 63 and the other rotor section includes a shaft 71 having ends journaled in the bearings 72 and 73.

A plurality of axially spaced multiple tine and hub assemblies 150 are shown mounted on shafts 61 and 71 which upon rotation operate to till the soil. There are four tines in each of these assemblies and the alternating tines are designated left and righthand tines 155 and 156, respectively, each with a shank portion and with hoe portions that alternate to project axially in one direction and then axially in the other direction to cut a width of soil indicated in dashed lines as rectangular blocks in FIG. 6 designated 154.

The lateral extremities of the hoe portions of adjacent tine and hub assemblies overlap. Adjacent multiple tine and hub assemblies are successively rotated through a selected offset angle about the associated rotor shaft to offset adjacent hoe portions in a spiral pattern, as described hereinafter.

The rotor for the wing sections B and C, with particular reference to FIG. 6, includes a shaft 83 having ends journaled in bearings 84 and 91 and intermediate its ends in bearing 89. Each rotor shaft of the wing carries a plurality of axially spaced multiple tine and hub assemblies 150 that cut a pattern indicated in dashed lines 154. In one embodiment shafts 61, 71 and 83 are of the same length of 93 inches and each carries twelve tine and hub assemblies for a total of 48 tine and hub assemblies spreading a span of about 30 feet.

The tilling implement shown is specifically adapted to be drawn by a tow vehicle such as a tractor with the conventional three-point hitch. Only the bottom links are used. For this purpose two laterally spaced lug pairs 38 and 39 extend forwardly from the front cross member or tool bar 34 on opposite sides of the center line of the implement. A portion of the lower links of the hitch of the tow vehicle is indicated at 41.

The rotor drive train 23 shown includes a central drive shaft 43 having telescoping extensible and retractable drive sections to adjust in length and is disposed at a central position. Drive shaft 43 has an input universal or U-joint 44 at one end and an output U-joint 45 at the opposite end. The output U-joint 45 is coupled to the input shaft of a right-angle gear speed reducer 46 having opposite output shafts 47 and 48, respectively, extending laterally out in opposite directions.

Output shaft 47 is coupled via an intermediate coupling 51, herein referred to as a shock-absorbing shear pin coupling, to a cross drive shaft 52 on one side of the center line 40 and, similarly, output shaft 48 is coupled via a shock-absorbing shear pin coupling 53 to cross drive shaft 54 on the other side of the center line 40.

The power from the cross drive shaft 52 is connected via a chain coupling assembly 56 to the rotor shaft below and the power from the cross drive shaft 54 is connected to the rotor shaft below via a chain coupling assembly 57. These chain coupling assemblies 56 and 57 are inset from the laterally outer ends of the rotor shafts of the central section to allow for the movement of the telescoping drive shaft couplings 77 in the drive train extension connected between the center section and wing sections.

The power train coupling to each wing section is in the form of a drive shaft 77 having telescoping extensible and retractable drive sections to adjust in length and having an input universal or U-joint 78 coupled to the chain drive 56 and an output U-joint 79 coupled to a cross drive shaft 80 on the wing section. Cross drive shaft 80 is supported for rotation on the wing section by a pillow block 81. The laterally outer end of the cross drive shaft 80 is coupled via a chain coupling assembly 82 to the rotor shaft below.

As best seen in FIG. 8, each of the chain coupling assemblies includes a sprocket 95 on the cross drive shaft, a sprocket 96 on the rotor shaft, and a chain 97 trained over these sprockets.

As seen in FIGS. 1-8, the mounting and pivotal connection between the central section and each wing section includes a laterally extending front link 101 and a laterally extending rear link 102 parallel to the front link and joined by a connecting member 100 to form a hinge tube weldment having a generally U-shaped configuration.

Each of links 101 and 102 is pivotally connected at a lower end to an inner side of the wing section, and specifically to laterally inwardly and downwardly inclined front and rear frame members 99 that extend beyond the rear tool bar 35a, by front and rear pivot pins 103 and 104, respectively. This pivotal connection enables the wing section to pivot about a first axis designated A1. Front link 101 is pivotally connected at an upper end to the upper support frame of the central section by a pin 105 journaled in an upstanding bearing block and rear link 102 is pivotally connected to the central section by a pin 106 journaled in two upstanding bearing blocks to enable the wing section B to pivot about a second axis designated A2.

In sequence in the raising of the wing section, as shown in FIGS. 4 and 5, the wing section pivots first about the first axis A1 of pins 103 and 104 until the inner side of the wing section engages the links 101 and 102 and then pivots about the second axis A2 of pins 104 and 105.

For the elevation of the wing section there are provided a second link 107 at the rear of the upper support frame only, pivotally connected at a lower end by pin 108 to the top of the wing section at a position laterally outwardly of the first and second axes at a third pivot to pivot about a third axis designated A3, and a thrust link 109 pivotally mounted on the upper frame of the central section about pin or shaft 106 to rotate about the above mentioned second axis A2 and having one end pivotally connected in an elongated slot 111 by pin 112 in the second link so that pin 112, when moved to the end of the slot as shown in FIG. 5, defines a fifth pivot that rotates about a fourth axis designated A4. An opposite end of link 109 is pivotally connected to a two-way hydraulic cylinder 113 at pin 114 forming a sixth pivot. An essentially four-sided linkage connection is formed in the structure between the axes A1, A2, A3 and A4, as seen in FIG. 5.

The thrust link 109 is comprised of two parallel spaced generally triangular plates mounted on a mounting shaft which in turn is mounted to rotate on shaft 106. The mounting shaft of thrust link 109, as best seen in FIG. 7, is between the forward bearing block supporting shaft 106 and link 102 and rotates independently of links 101 and 102.

In the lowered working position shown in FIG. 4 with the slot in link 107, the wing section is free to pivot up and down about the lower axis A1 defined by pivot pins 103 and 104 to adjust to the contour of the ground. In this position the link assembly 100, 101 and 102 is held in the vertical position shown.

For locking this link assembly in the vertical position there is provided an inverted channel 301 affixed to connecting member 100 and a depending stop 302 connected to thrust link 109, as shown in FIG. 4. The Stop 302 on link 109 is lowered hydraulically by cylinder 113 so as to rest on channel 301 and this serves to lock links 101 and 102 in the vertical position shown in FIG. 4. A threaded bolt 118 is mounted on link 102 and a slotted flange 119 is mounted on the center section A to serve as alternate structure to lock the wing section in the lowered working position.

As the cylinder 113 is extended, thrust link 109 is rotated clockwise as viewed from the rear of the machine (FIGS. 4 and 5) and a pulling force is exerted on said wing section via said second link 107 to move the wing section to the raised position. A ratchet-type bar 115 of adjustable length is connected between the end of link 107 at pin 116 and the main frame at pin 117 to lock the wing section upright.

The hydraulic system for actuating the hydraulic cylinders 113 and 113a for raising the wing sections B and C is shown to include a pressure line 121 coupled to the hydraulic system of the tractor or like towing vehicle into the input side of a flow divider 122 that divides the hydraulic pressure over lines 123 and 123a via check valves 124 and 124a, respectively, so that the presence of the flow of hydraulic fluid under pressure causes the cylinders to extend and simultaneously raise the wing sections A and B.

To retract the wing sections, the flow to the cylinders 113 and 113a is shown to pass from a line 126 from the fluid system of the tractor through T-coupling 127 that divides flow over lines 128 and 128a via the check valves 124 and 124a to the other side of the cylinders 113 and 113a. The check valves 124 and 124a serve to lock the cylinders when the line pressure is removed.

Referring now to FIG. 9, the shock-absorbing shear pin coupling 51 is shown in more detail to include an input hub 137, intermediate hub 138 and an output hub 139 arranged axially along and concentric with an axis of rotation.

The input hub 137 has an input sleeve portion 141 with an internal spline surface to slide over and rotate conjointly with the output shaft of the speed reducer, an output flange 142, and an internal sleeve portion 143.

The intermediate hub has a stub shaft 144 that extends into the internal sleeve portion 143 in a close fitting slidable relation and serves as a guide for the input hub, an input flange 146 and an output flange 147. A pair of shear pins 148 in the form of bolt and nut fasteners are disposed at diametrically opposite positions and extend through and fasten the output flange 142 to input flange 148. When there is a severe overload on the rotor, the shear pins 148 break and the input hub will continue to rotate while the intermediate hub stops rotating. The output flange 148 is generally star-shaped with three lobes arranged at 120-degree intervals about its axis of rotation.

The output hub 139 has an output sleeve portion 149 with an internal hex-shaped surface that slides over the cross drive shaft, and an input flange 157. The input flange is generally star-shaped with three lobes arranged at 120-degree intervals about the axis of rotation.

A flexible shock-absorbing assembly comprised of four axially spaced, hollow, disc-shaped or washer-like members 158 is clamped between the output flange and the input flange. Members 158 preferably are made of fiber-reinforced rubber and are concentrically arranged about the axis of rotation.

The flexible members are clamped to the output flange 148 at circumferentially spaced positions by a bolt and nut fastener 159a that extends axially through the hub flange and the disc-shaped members. In turn the flexible element is clamped to the input flange at circumferentially spaced positions by a bolt and nut fastener 159b that extends axially through the disc-shaped members. The input and output hub flanges 148 and 157 are offset through an angle of 60 degrees about the axis of rotation as viewed from the end. A washer 140 is associated with the hole in each disc-shaped member through which a bolt extends to prevent a tearout in the member.

In use the rotary motion applied to the input hub is transmitted via the shear pins and flexible element to the output hub. Relatively small shock and relatively small torque overloads of the rotor are absorbed by the flexible element, and in the event of relatively large torque overloads the shear bolts break to prevent damage to the speed reducer 46 and chain coupling assemblies 56 and 57.

Referring now to FIGS. 10-16, each multiple tine and hub assembly 150 is shown to include a sectional hub 151 formed in two half-bodies 152 and 153 of identical shape that carry four tines. These tines are arranged in an equally spaced angular relationship about the center of the hub, which is the axis of rotation for the tilling rotor. The tines alternate as left-hand tines designated 155 and right-hand tines designated 156 with the hoe portions alternately extending axially first in one direction and then in the opposite direction, as above discussed.

Each hub half-body shown in FIG. 10 includes an axially extending, generally semicircular, hub portion 161 with a four-sided recess 162 shown shaped to receive one half of the hex-shaped rotor shaft and a web 160 extending radially out of the hub portion formed with radially extending and axially projecting fastening flanges 163 and 164 on both faces of the web. Each fastening flange has two holes 165 and 166 that aline with holes in the opposite hub body to receive bolt and nut fasteners 167 and 168 to releasably fasten the hub to the shaft 61.

Each hub body further includes a pair of parallel spaced ribs 171 and 172 projecting out from the web and spaced to receive the shank portion of the left-hand tine 155 that is fastened thereto by bolts 173.

Further, there is provided a pair of parallel spaced ribs 176 and 177 projecting out from the web and spaced to receive the shank portion of the right-hand tine 156 that is fastened to the hub by bolts. A pair of bolt holes 174 and 175 is provided in the hub for each tine.

The arrangement of the recess in the hub that mates with the rotor shaft alternates from hub to hub along the shaft. Recess 162 has an apex or point formed by two flat surfaces at the top. The next hub 151a on the shaft is rotated 30 degrees about the center and has a recess 162a with a flat surface 162b at the top, as is shown in FIG. 15. Successive angular displacement of the tine and hub assemblies along the rotor shaft through an angle of 30 degrees is accomplished by using the hex-shaped shaft and alternating the two hub recess shapes as shown in FIGS. 10 and 15.

Upon rotation of the hoe portion through a radius R, the cutting edge 199 circumscribes a tine circle designated by numeral 179.

Referring now to FIGS. 10, 15 and 16, the left-hand tine 155 shown is in the form of a unitary body made from strip of flat bar stock which has an elongated shank portion 181 and a hoe portion 182 forming an extension of one end of the shank portion. The shank portion has a flat outside surface 183 and a flat inside surface 184 that are disposed perpendicular to the axis of rotation of the tine, and further has a leading edge and a trailing edge. A pair of holes 188 and 189 are provided in the shank portion to facilitate its being fastened to the hub by bolt and nut fasteners 191 and 192.

The hoe portion 182 extends back from the shank portion at a trailing angle designated E, projects out at a selected lateral angle designated F, and tilts down at a selected tilt angle designated G. With this configuration the leading edge of the shank portion is lower than the trailing edge. In practice, it has been found that a tine having an angle E of about 25 degrees, an angle F of about 80 degrees and an angle G of about 65 degrees affords a highly efficient and effective tilling of the soil. The hoe portion has a flat outside surface 193, a flat inside surface 194, a leading edge, and a trailing edge.

As shown, the hoe portion has outside and inside surfaces and leading and trailing edges that are extensions of the outside and inside surfaces and the leading and trailing edges, respectively, of the shank portion. Further, the outside surface of the shank portion is opposite from the direction in which the shank portion extends away from the hoe portion.

The outside surface of the shank portion is beveled at 188 and the outside surface of the hoe portion is beveled at 198 along the same side of the body to form a sharpened leading cutting edge 199 that, as viewed from the front, extends down, curves along a radius, and then extends laterally away from the shank portion and down along a continuous line.

The inside surfaces of the shank portion and hoe portion along the same side of the tine body are made smooth and are hard-surfaced at 200 in the area rearwardly from the cutting edge to approximately the dashed lines 201. A hard-surfacing procedure that has been found to be particularly effective for this purpose uses a composite nickel-base tungsten carbide powder sold commercially as STOODY 85 T. G. This material is in the form of a fine powder that sprays onto the surface and is applied using an oxy-acetylene torch.

In practice it was found that the power required to rotate and move the tines through the soil was greatly reduced by having the bevel on the outside surface of the shank and hoe portions and having the hard-surfacing and a smooth surface on the inside surface as shown.

On the hub, each tine in a stationary position is shown to have a relief or clearance angle along the bevel measured from a tangent line L that is tangent to the tine circle 179 designated H. There is also a selected angle designated J measured from the tangent line L to the inside surface 194 of the hoe portion. A clearance angle from the tangent line L to outside surface 193 is slightly less than angle J. In practice, in the stationary position an angle H of about 12 degrees and an angle J of about 26 degrees were found to afford best results.

Test results for the above described rotor indicated there was a preferred ratio of peripheral velocity of the hoe portion or blade designated "u" to forward speed of the machine designated "v" for certain in-motion blade clearance angles for the most efficient operation. These results are tabulated as follows with the preferred parameters listed first and a parameter range listed as the second and third items:

| | $\frac{u}{v}$ | u fpm | v fpm | Apparent Clearance Angle (degrees) | Blade Depth (inches) |
|---|---|---|---|---|---|
| (1) | 2.4 | 1533 | 616 | 26.6 | 3 |
| (2) | 2.93 | 1803 | 616 | 24.3 | 8 |
| (e) | 2.5 | 1533 | 616 | 28.0 | 8 |

The in-motion apparent clearance angle is measured from the tangent line to the bevel, which is designated H in FIG. 10. A discussion of these apparent angles of a rotor in forward movement and rotating about an axis is found in the 1974 *Transactions of the ASAE* at pages 4–7, by James G. Hendrick and William R. Gill.

In a full sequence of operation for the above described apparatus, assuming the wing sections are down and on substantially level ground, the front depth gauge wheel assemblies are adjusted by adjusting link 76 to set the depth of the tiller blades (2–3 inches) in the soil. The machine is then leveled mechanically (front to rear) by adjusting the mechanical linkage 134 on the rear lift-assist wheel assemblies 131 and 132. The machine is then ready for tilling.

Typically the next step in the sequence is to raise the machine to an elevated transport position by extending the hydraulic cylinders 136 and raising the lower draft link 41. The machine is then transported by the pulling tractor to the point of use. After reaching the point of use the lower draft links 41 are lowered, putting all of the weight on the front wheel assemblies. The rotor is started turning by actuating central drive shaft 43 and the rear of the machine is then lowered to the previously established level position by retracting cylinders 136 and shifting the weight of the rear of the machine to the rear lift-assist wheel assemblies.

Finally, the wing cylinders 113 and 113a are set in the fully retracted position (FIG. 4) to lock link assembly 100, 101, 102 down so that the wing sections are free to move up and down relative to lower pivots 103 and 104 and axis A1 to adjust to the contour of the ground. In the embodiment shown the wing sections will move up 11 degrees and down 11 degrees in relation to the horizontal or to the extent of about 18 inches either way.

When it is desired to transport the machine, as along the highway, the wing sections are raised to the upright position as shown in FIG. 5 to reduce the overall width.

By way of illustration, the below listed devices have been found suitable for use in the above illustrated apparatus:

| Ref. Numeral | Model No. | Manufacturer |
|---|---|---|
| 31, 32 | 780-56 | Orthman Mfg., Inc. |
| 46 | WA 98K | Warner Engineering, Inc. |
| 122 | 100 AB | Brand Hydraulics |
| 124 | 409-04 | Metro Hydraulics |

Although the present invention has been described with a certain degree of particularity, it is understood that the present disclosure has been made by way of example and that changes in details of structure may be made without departing from the spirit thereof.

What is claimed is:

1. In a tilling implement, the combination comprising:
   a tilling rotor supported for rotation by a support, said rotor including a rotor shaft and a plurality of axially spaced multiple tine and hub assemblies mounted on said rotor shaft at spaced intervals along said rotor shaft, each said assembly having a plurality of soil-working tines, each with a radially extending shank portion, and hoe portions that alternate to project axially in one direction and axially in the other direction, the hoe portions of adjacent of said assemblies overlapping to cut a width of soil; and
   a rotor drive train on said support for transmitting rotary power from a power source to rotate said tilling rotor to work the soil through which said tilling rotor is advanced while rotated, said drive train including a central drive shaft and a cross drive shaft coupled to and extending laterally out from a side of said central drive shaft, said cross drive shaft being above and generally parallel to said rotor and coupled to said rotor shaft by a first coupling, said support, tilling rotor and rotor shaft being constructed as a central section and at least one wing section pivotally connected to a side of the central section to pivot about a first axis to move up and down to adjust to irregular soil contours, said first axis being in substantially the same horizontal plane as the axis of the rotor shaft of said central section to provide a minimum variation in tillage width for each row, said wing section being arranged to swing between a lowered working position and a raised position for transport.

2. In a tilling implement as set forth in claim 1 wherein said support includes an upper support frame having a front cross member, a rear cross member and a plurality of laterally spaced, longitudinal, connecting members joining said cross members to form a generally rectangular truss, laterally spaced upright sidewall portions extending below said upper support frame with bearings in which said shaft is journaled for supporting said rotor for rotation below said upper support frame, and at least one front depth gauge wheel assembly and at least one rear lift assist wheel assembly for supporting said support and rotor for vehicular movement.

3. In a tilling implement as set forth in claim 2 wherein said front depth gauge wheel assembly includes a support arm having at least one wheel at one end and being pivotally mounted to the support at the opposite end and an adjustable link to change the angular position between the support arm and the support, said rear lift assist wheel assembly including a support frame having a swivel wheel at one end and pivotally mounted to the rear of the support at the opposite end, a mechanically adjustable link to change the angular position between the support frame and for leveling the support, and a two-way cylinder between the support frame and support to raise the rotor above the soil for transport of the implement.

4. In a tilling implement as set forth in claim 1 wherein said support has a hitch for releasably coupling said support to the lower links of a three-point hitch extending rearwardly from a tow vehicle.

5. In a tilling implement as set forth in claim 1 wherein said tines are mounted in groups of four on a hub fastened to said rotor shaft to provide said plurality of axially spaced multiple tine and hub assemblies along said rotor shaft, the tines on each hub having alternating left-hand and right-hand hoe portions that project axially in one direction and then axially in the opposite direction, each successive hub along said rotor shaft being rotated through a selected offset angle about said shaft to offset successive adjacent tine portions in a spiral pattern.

6. In a tilling implement as set forth in claim 5 wherein said shaft and each hub are hexagonally shaped to offset adjacent multiple tine and hub assemblies through an angle of 30 degrees.

7. In a tilling implement as set forth in claim 5 wherein said hub is formed as two half-bodies of identical shape that are releasably fastened to one another around said rotor shaft, each said half-body including a hub portion with a recess shaped to receive and mate with a portion of the rotor shaft, a web extending out from the hub, and two sets of axially extending parallel spaced ribs to provide a cup-like receptacle to receive and hold two tines at 90 degrees to one another, said hubs along said rotor shaft having a recess in the hub that is turned through an angle of 30 degrees to provide angular displacement of adjacent tines along the shaft of 30 degrees.

8. In a tilling implement as set forth in claim 1 wherein each tine includes a tine body having a shank portion and a hoe portion forming an extension of one end of said shank portion, said hoe portion extending laterally out from the shank portion, back, and down at selected angles, the outer side surfaces of said shank portion and hoe portion being beveled along the same side of said body to form a sharpened leading cutting edge that extends down, curves and extends laterally out along a continuous line, the inner side surfaces opposite the bevel being smooth and hard-surfaced.

9. In a tilling implement as set forth in claim 1 wherein said rotor drive train includes a right-angle gear speed reducer having an input shaft coupled to said central drive shaft and an output shaft at right angles to said input shaft coupled to said cross drive shaft, said central drive shaft having extensible and retractable telescoping sections for changing in length and a universal joint at each end, said first coupling including a first sprocket on the rotor shaft opposite the first sprocket, and a chain extending around said sprockets, each flexible coupling being connected between the output shaft of the speed reducer and an associated cross drive shaft.

10. In a tilling implement as set forth in claim 1 including wing drive means for applying upwardly directed forces to said wing section to move said wing section to the raised position.

11. In a tilling implement as set forth in claim 1 including wing lock means to lock said wing section in the raised position and in the lowered working position.

12. In a tilling implement as set forth in claim 1 wherein each pivotal connection includes first link means extending down along the outer side of said central section and pivotally connected at a lower side to an inner side of said wing section to provide pivotal movement between said first link means and said wing section about said first axis, said first link means being pivotally connected at an upper side to said central section to provide pivotal movement of said first link means relative to said central section about a second axis, the wing section being pivotal about said first axis to a partially raised position until the wing section engages an outer side of said first link means and then pivotal about said second axis to a raised position, and drive means connected to the top of said wing section at a position laterally outwardly of said first and second axes for applying an upwardly directed pulling force to said wing section to move said wing section to said raised position.

13. In a tilling implement as set forth in claim 12 wherein said drive means includes a thrust link pivotally connected above the central section to rotate about a point at said second axis and pivotally connected to a second link at a movable pivot, said second link being pivotally connected at a third pivot to said wing section to form an essentially four-sided linkage connection.

14. In a tilling implement as set forth in claim 13 wherein said thrust link includes a mounting shaft and a pair of parallel spaced generally triangularly shaped plates affixed to said mounting shaft, said mounting shaft being rotatable about a rear pivot pin also supporting said first link means for rotating about said second axis, said first link means and thrust link being rotatable independently of one another.

15. In a tilling implement as set forth in claim 12 wherein said first link means has a generally right-angle shape and includes an upper leg having a free inner end pivotally connected to the central section at said second axis and a lower leg having its lower free end pivotally connected to said wing section at said first axis.

16. In a tilling implement as set forth in claim 12 wherein said first link means includes opposed forward and rear links joined by a connecting member to form a generally U-shaped hinge tube weldment.

17. In a tilling implement as set forth in claim 12 further including means to lock said first link means in a vertical position to said central section with the wing section free to rotate about said first axis.

18. In a tilling implement as set forth in claim 17 wherein the means to lock the first link means in the vertical position includes a stop member carried by a thrust link means for moving said wing section, said stop member being moved to a seated position on said connecting member.

19. In a tilling implement as set forth in claim 1 wherein said rotor drive train includes a cross drive shaft section for said central section, a cross drive shaft section for said wing section, and an adjustable coupling between said drive shaft sections, said adjustable coupling having extensible and retractable telescoping sections to change in length as the wing section is pivoted relative to the central section.

20. In a tilling implement as set forth in claim 13 wherein said second link has an elongated slot at one end in which said movable pivot is slidably movable to limit the extent of upward movement of said wing section as it pivots about said first axis in adjusting to the contour of the ground over which said wing section is moved.

21. In a tilling implement as set forth in claim 13 wherein said drive means includes a push-pull drive connected at one end to said central section and at the opposite end to said thrust link at a pivot to rotate said thrust link about said second axis upon the extension of said push-pull means to raise said wind section.

22. In a tilling implement with fold-up wing sections, the combination comprising:
  a central section carrying a tilling rotor;
  a pair of opposed wing sections pivotally connected to opposite sides of said central section each carrying tilling rotors, each of said central section and wing section tilling rotors including a rotor shaft and a plurality of axially spaced multiple tine and hub assemblies mounted on said rotor shaft at spaced intervals along the associated rotor shaft, each said assembly having a plurality of soil-working tines, each with a radially extending shank portion, and hoe portions that alternate to project axially in one direction and axially in the other direction, the hoe portions of adjacent of said assemblies overlapping to cut a width of soil, the pivotal connection between each wing section and said central section including:

a first link having a side portion pivotally connected to a lower inner side portion of an associated wing section at a first pivot to enable the wing section to pivot about a first axis to move up and down to adjust to irregular soil contours, said first axis being in substantially the same horizontal plane as the rotor shaft of the central section to provide a minimum variation in tillage width for each row, said first link being pivotally connected at an upper side to said central section to provide pivotal movement of said first link relative to said central section about a second axis, a thrust link having an intermediate portion mounted on the top of said central section to rotate about a horizontally disposed axis fixed in relation to said central section and having opposite first and second end portions, and a second link having one end portion pivotally connected at the top of said wing section to pivot about a third axis and the other end portion connected to the first end portion of said thrust link;

push-pull means coupled to said thrust link to effect the swinging of each wing section between a lowered position and an upright position, said push-pull means being connected to the second end portion of said thrust link whereby as said push-pull means is extended said thrust link is rotated about said fixed axis and said wing section pivots about said first axis with said first and second links supporting the weight of said wing section until an inside edge of said wing section engages a side of said first link and during the next rotation to a position where the wing section is substantially upright, said thrust link being locked against rotation to hold the wing section in the upright position; and a rotor drive train for transmitting rotary power from a power source to rotate said rotors to work the soil through which said rotors are advanced while rotated.

23. In a tilling implement as set forth in claim 22 wherein said rotor drive train includes an upper cross drive shaft on said central section and a cross drive shaft on each of said wing sections and an adjustable coupling between said central section and wing section drive shafts, said adjustable coupling having extensible and retractable telescoping sections to change in length as the wing section is raised and lowered, and a U-joint at each end.

24. In a tilling implement as set forth in claim 22 wherein said push-pull means includes a two-way hydraulic cylinder for each wing section and a divider valve to divide the fluid flow to each cylinder to simultaneously raise said wing sections.

* * * * *